United States Patent [19]

Polin

[11] 4,030,594

[45] June 21, 1977

[54] DOUGH TRANSFER APPARATUS

[75] Inventor: Antonio Polin, Verona, Italy

[73] Assignee: Ing. Polin & C di Polin Ing. Antonio & C. S.a.s., Verona, Italy

[22] Filed: Apr. 12, 1976

[21] Appl. No.: 675,867

[30] Foreign Application Priority Data

Sept. 26, 1975 Italy .................................. 3543/75

[52] U.S. Cl. ............................ 198/489; 198/491; 198/592; 198/631

[51] Int. Cl.² ..................................... B65G 47/52

[58] Field of Search ............. 198/20 R, 86, 94, 99, 198/471, 488, 489, 491, 592, 750, 574, 631; 425/364 R

[56] References Cited

UNITED STATES PATENTS

| | | | |
|---|---|---|---|
| 499,460 | 6/1893 | Hooper | 198/86 X |
| 512,377 | 1/1894 | Hooper | 198/86 X |
| 903,591 | 11/1908 | Long | 198/20 R |
| 1,207,181 | 12/1916 | Kuhtz | 198/20 R |
| 2,091,543 | 8/1937 | Heim | 198/20 R |
| 2,217,020 | 10/1940 | Jurgens et al. | 198/20 R |
| 3,354,613 | 11/1967 | Anderson et al. | 198/592 |
| 3,701,406 | 10/1972 | Aasted | 198/631 |
| 3,779,367 | 12/1973 | Hope et al. | 198/592 |
| 3,821,452 | 6/1974 | Hayashi | 425/364 R |
| 3,842,963 | 10/1974 | Kemper | 198/592 |
| 3,844,402 | 10/1974 | Hayashi | 198/20 R |
| R24,843 | 7/1960 | Jeddeloh | 198/20 R |

Primary Examiner—Evon C. Blunk
Assistant Examiner—Richard K. Thomson
Attorney, Agent, or Firm—Browdy and Neimark

[57] ABSTRACT

An apparatus for automatically transferring pieces of dough onto a movable platform, and in particular for transferring pieces of dough from a prefermentation chamber onto a movable platform located below it so that the pieces of dough are perfectly aligned and do not lose their correct shape. The apparatus can be easily disengaged without hindering the rest of the operation. The platform oscillates from an upper fixed position to a lower fixed position. Mechanical means provide the platform with an oscillating motion and keep the platform locked in the fixed positions for a predetermined amount of time. Other mechanical means cause the pieces of dough to be discharged from the platform when it is in its lower fixed position.

3 Claims, 3 Drawing Figures

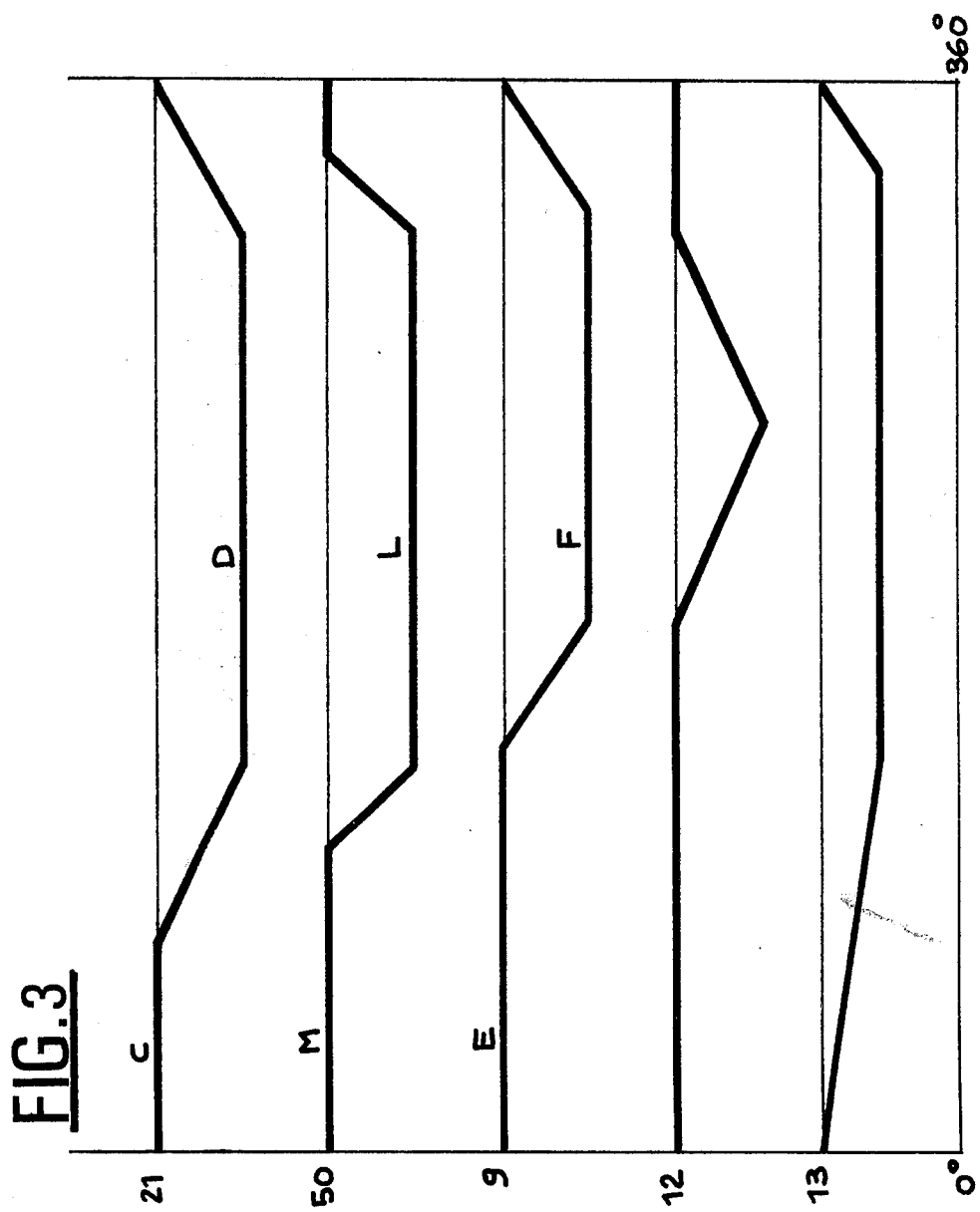

DOUGH TRANSFER APPARATUS

BACKGROUND OF THE INVENTION

This invention relates to an apparatus for automatically transferring pieces of dough onto a movable platform and, in particular, for transferring pieces of dough from a prefermentation chamber onto the movable platform located below it.

In panification plants it is essential, for processes which involve the molding of the pieces of dough, for them to arrive at the molding machine in batches aligned perfectly along a direction transverse to the infeed motion, the purpose of this being to enable a precise molding operation to be carried out contemporaneously on the full batch.

For many of the panification process phases it is always important for the pieces of dough to remain aligned perfectly on the conveyor means and this requirement is particularly felt during the phases when the pieces of dough are removed from a prefermentation or yeast raising chamber, or from a certain height, to be deposited onto a movable platform, such as a belt conveyor, below.

DESCRIPTION OF THE PRIOR ART

The items of equipment currently known either do not fully answer the said requirements or else they present certain difficulties which the present invention proposes to overcome. In particular, the said difficulties are found when pieces of dough of a somewhat thin elongated shape have to be transferred and be sent forward to the molding machine.

In such cases because of the fact that pieces of dough so shaped tend to move and to incline out of the desired position of alignment, the items of equipment of a known type encounter rather a lot of difficulty.

SUMMARY OF THE INVENTION

One of the objects of the present invention is, therefore, to enable the pieces of dough to be efficiently and rapidly transferred, particularly from the pans in which they are held during the prefermentation phase, onto a movable platform below in such a way that they arrive on this in a perfectly aligned fashion.

Another object of the present invention is to provide an apparatus which can easily be taken out of operation without this causing any hindrance to the flow of the pieces of dough on the movable platform below in such cases when, for example, the pieces of dough, instead of being fed onto the movable platform from the prefermentation chamber, arrive thereon at a prior point while the movable platform is moving along in its infeed direction.

Yet another object still is to enable the pieces of dough to be transferred by removing them from a level considerably higher than that of the movable platform below, without causing them, however, to suffer a harmful loss of their correct shape.

The foregoing and other objects too have all been attained with the present invention, essential features of which are that it consists of a platform on which are rested the pieces of dough coming from the apparatus overhead, for example, the prefermentation chamber, the said platform oscillating between an upper furthermost fixed position, below the area where the pieces of dough are discharged from the apparatus overhead, and a lower furthermost fixed position, a slight distance above the movable platform; mechanical means for providing the platform with an oscillating motion and for keeping the platform locked in the said furthermost fixed positions for a predetermined amount of time; and other mechanical means for causing the pieces of dough to be discharged from the platform when the latter is in its lower furthermost fixed position.

BRIEF DESCRIPTION OF THE DRAWINGS

Further characteristics and advantages of the present invention will emerge more clearly from the following detailed description of a preferred but not the sole form of embodiment for the apparatus in question, illustrated purely as an unlimited example on the accompanying drawings in which:

FIG. 3 shows in graph form, the movement and immobility phases of the moving parts of the apparatus.

DESCRIPTION OF THE PREFERRED EMBODIMENT

Figure 1:
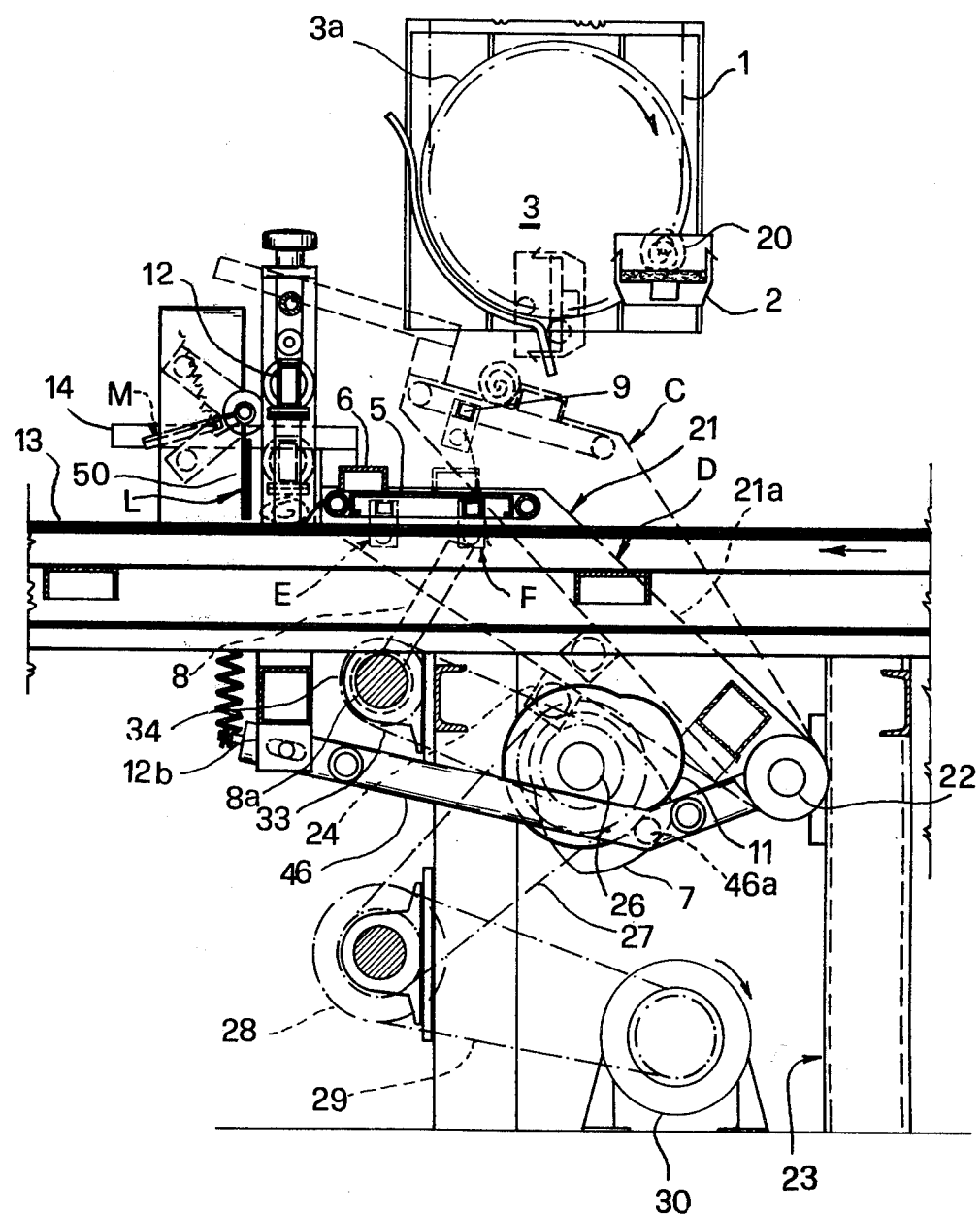
FIG. 1 shows in diagrammatic form, a vertical longitudinal section of the apparatus forming the subject of the invention, installed in the area where the pieces of dough are discharged from a perfermentation chamber so that they can be transferred onto a movable platform below.
Figure 2:
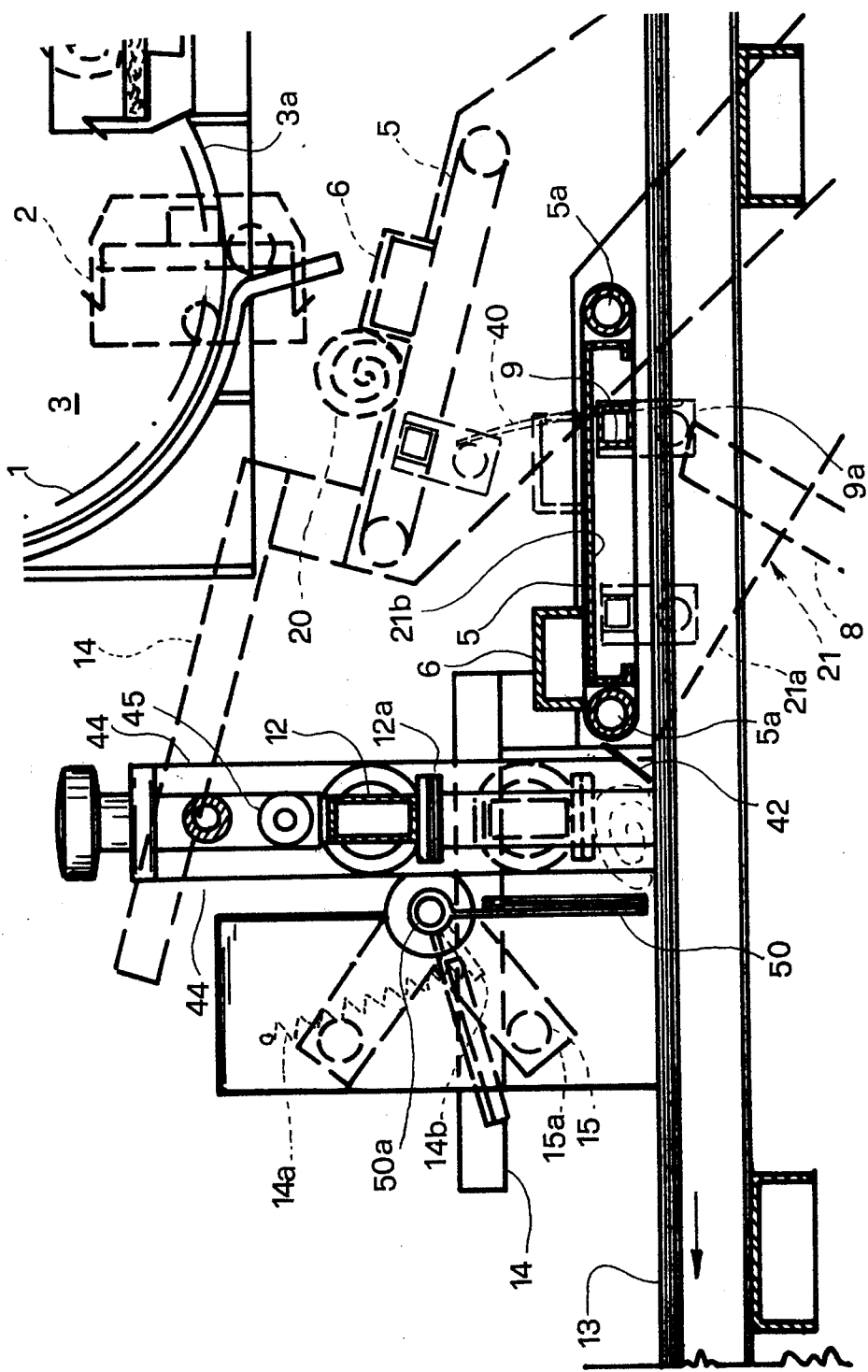
FIG. 2 shows a detail of FIG. 1 on an enlarged scale.

With reference to the aforementioned figures, at (3) is shown the area in which the pieces of dough (20) are discharged from a prefermentation chamber and from which, after the prefermentation phase is over, they have to be transferred onto a movable platform (13) below, constituted by a long belt conveyor of a known type.

The conveyor (13) carries the pieces of dough to a molding machine (not depicted on the drawings) poositioned further along the line. Pans (2) arrive at the area (3), these being of a known type carried by two side by side prefermentation chamber chains (1) which partially wrap around two side by side wheels (3a), thus determining an area a minimum distance away from the belt conveyor underneath.

In the said area (3), using known means, the pans are turned upside down.

At a position midway between the discharge area (3) and the belt conveyor (13) a platform is provided and on this are rested the pieces of dough discharged from the pans (2). The said platform consists of an endless belt (5) held taut between two rotatable idle drums (5a), the axes of which are parallel and horizontal.

The said drums are carried by an oscillating frame (21) constituted essentially by two lateral sides (21a), to which are pivoted the shafts of the drums (5a) and by a crosswise strengthening member (21b), which connects the lateral sides (21a) one to the other and also acts as a support for the upper part of the belt (5).

The said frame (21) externally enshrouds the belt conveyor (13) and its sides (21a) are pivoted at (22), below the conveyor (13), to the fixed support frame (23) of the latter.

The shaft (22) is horizontal and transverse with respect to the direction in which the conveyor (13) moves forward.

The sides (21a) each carry an idle roller (24) on their lower edge. Beneath the said rollers (24) and working in conjunction with them, there are two corresponding rotating cams (7) and these are carried by a horizontal, transverse shaft (26) which rotates at a constant, uniform speed, driven, through transmission devices (27), (28) and (29), by a geared motor (30).

The profile of the rotating cams (7) is such that the frame (21), and thus also the endless belt (5), are given a motion which causes them to oscillate between a lower furthermost and an upper furthermost position and to halt in each of these extreme positions.

In the upper furthermost position C, shown in FIG. 1 with broken lines, the belt (5) is positioned as close as possible, taking into consideration the need not to obstruct the passage of the pans (2), to the area where the pieces of dough (20) are discharged from the prefermentation chamber and its degree of inclination is in line with the infeed direction of the conveyor (13).

When in the lower furthermost position D, the belt (5) is placed horizontally, as close as it can possibly get to the upper side of the belt conveyor (13).

A crosswise support member (6) is fixed to the upper part of the belt (5) and this is constituted by a section which travels transversely along the full surface area of the said belt (5). The lower part of the said belt (5) is secured to a crossbar (9), slidingly sustained by the crosswise strengthening member (21b), which carries on its ends two spigots (9a) that protrude downwards, externally to the upper part of the belt conveyor (13).

To the fixed support frame (23) of the conveyor (13), in position underneath the endless belt (5) when this is in its lower furthermost position D, is fixed a horizontal, transverse shaft (8a) and this has secured to its ends, two parallel arms (8).

The said shaft (8a) rotates at a constant, uniform speed, driven, through a chain (33), by a gearwheel (34) keyed to the shaft (8a).

The position of the shaft (8a) is such and the length of the arms (8) is so designed that when the endless belt is in its lower furthermost position D, the said arms intercept the spigots (9a) over an angular distance sufficient to move the said spigots from a position E, shown in FIG. 1 with broken lines, closer to the drum (5a) further along in the direction in which the belt conveyor (13) moves forward, towards a position F closer to the drum (5a) further back, that is to say, to a position in the opposite direction to that in which the belt conveyor (13) travels.

Correspondingly, the upper part of the endless belt (5) is moved from an initial furthermost position in which the said upper part has a working area sufficient to accept the pieces of dough (that is to say, the area of the said upper part between the drum (5a) further along in the direction in which the belt conveyor (13) moves forward and the crosswise support member (6) is sufficient to accept one row of pieces of dough), to a second furthermost position in which the said working area is outside the upper part (and correspondingly, the crosswise support member (6) is carried onto the drum (5a) further along in the direction in which the belt conveyor (13) moves forward).

On the fixed support frame (23), laterally to the belt conveyor (13) two fixed guides (40) are positioned and these come into contact with the spigots (9a) at the time the endless belt (5) is oscillating from the lower furthermost to the upper furthermost position.

While this oscillation is taking place, the said guides (40) cause the said spigots (9a) to be returned from position F to position E: correspondingly, the upper part of the endless belt (5) slides from the said second furthermost position to the said first furthermost position.

To the left of the drum (5a) located further along in the direction in which the belt conveyor (13) moves forward, there is a short fixed sloping platform (42) for the pieces of dough discharged from the endless belt (5).

Above the section of the belt conveyor (13) onto which the pieces of dough (20) are discharged from the endless belt (5), a flattening device is provided, this being to slightly alter the shape of the pieces of dough by flattening their bases in such a way as to prevent any displacement of the pieces of dough while the belt conveyor (13) is moving forward.

The said flattening device essentially consists of a horizontal crossbar (12) on the lower part of which there is a horizontal flattening surface (12a). The said bar (12) is carried by two lateral, vertical bars (12b) and is guided along a vertical path by lateral fixed guides (44) placed on both sides of the belt conveyor (13), along which slide the rollers (45) carried by the bars (12b).

The lower part of each of the bars (12b) is fastened to a lever (46), the fulcrum being on the shaft (22). Each lever (46) is operated by a cam (11) keyed onto the shaft (26), which turns a corresponding idle roller (46a) carried by the said lever (46).

The cam (11) is so profiled that, through the levers (46), it gives the bar (12) a short downward movement once the row of pieces of dough has been discharged onto the belt conveyor (13), then when the pieces of dough have had their shape altered slightly, the said bar (12) is returned upwards.

Above the belt conveyor (13) a transverse wall (50) oscillates around a horizontal, transverse shaft (50a).

Two arms (15a) are anchored to the extremities of the said shaft (50a) and these both carry an idle roller (15).

The lateral sides (21a) have fixed to them two rods (14) which are so arranged that they work in conjunction with the said rollers (15) and carry them from an upper furthermost to a lower furthermost position.

Correspondingly, the wall (50) is carried from a fixed sloping furthermost position M (shown in FIG. 1 with broken lines), in which the wall is raised away from the upper surface of the belt conveyor (13), to a fixed vertical furthermost position L, in which the wall is to the left (see FIG. 1) of the endless belt (5), the right distance away to halt the pieces of dough as soon as they are discharged from the endless belt (5).

When the rods (14) are raised, the return action of a helical spring (14a) moves a short arm (14b) integral with the shaft (50a) and thus the wall (50) is reinstated in position M.

The operation of the apparatus in question takes place in the manner described below.

Assuming that at the commencement of the cycle the endless belt (5) is at a standstill in the upper furthermost position C, a pan (2) arrives in the discharge area of the prefermentation chamber and is turned upside down, thus discharging its row of pieces of dough onto the endless belt (5) below.

Since the said belt is inclined, the pieces of dough also rest on the crosswise support member (6), which prevents them from rolling backwards and, at the same time, lines them up.

Once it has received the row of pieces of dough, the endless belt (5) is carried into the lower furthermost position D and while this displacement is taking place, the rods (14), integral with the frame (21), carry the wall (50) into the vertical furthermost position L.

Just as soon as the endless belt (5) arrives in position D, the arms (8) move the bar (9) from position E to position F, causing in this way the pieces of dough to be discharged from the endless belt (5).

The pieces of dough roll along the sloping platform (42) and halt in the narrow space between this and the wall (50) in a vertical position.

Thanks to the action of the crosswise support member (6), which prevent the pieces of dough from moving on the surface of the endless belt (5), and to the minimum distance existing between the latter and the belt conveyor (13), the pieces of dough thus arrive duly aligned on the said belt conveyor (13). In addition, the action of the wall (50) perfects the said alignment.

Once the pieces of dough are on the belt conveyor (13), the flattening surface (12a) causes, as described above, the shape of the pieces of dough to undergo a slight alteration.

Subsequently, the endless belt (5) is returned to the upper furthermost position C and, consequently, under the action of the guides (40), the bar (9) is reinstated in position E. Contemporaneously, the action of the spring (14a) causes the wall (50) to be returned to the furthermost sloping position M, so that the row of pieces of dough, the shape of which has been slightly altered, can move forward freely, carried by the belt conveyor (13).

At this stage, a fresh cycle identical to the previous one, then commences.

FIG. 3 diagrammatically shows, as an example, a graph in respect of the phases of movement and immobility of the moving parts of the apparatus forming the subject of the present invention.

Taking the angular rotation of the shaft (26) as the reference point, angular displacements are shown with abscissae.

The horizontal lines represent the phases of immobility, while the sloping lines represent the phases of movement.

It is obvious, therefore, that, thanks to the apparatus in question, it is possible to transfer the pieces of dough by removing them from a discharge area, even when this is positioned a considerable distance away from the movable transportation platform below, without this in any way breaking the continuity of the row of pieces of dough.

Furthermore, it is obvious that when, for example, in the case of the prefermentation chamber not being used and of the pieces of dough arriving on the belt conveyor (13) at a point further forward in the direction in which the said conveyor moves, the apparatus in question does not obstruct the passage of the pieces of dough at all, since all that has to be done is to place the endless belt (5) in the upper furthermost position C.

Obviously numerous practical application modifications can be made to this invention without any deviation from the framework of protection afforded thereto by the following claims.

What is claimed is:

1. An apparatus for automatically transferring pieces of dough onto a movable platform from an apparatus above it and, in particular, for transferring pieces of dough from a prefermentation chamber onto the movable platform located below it, comprising:

a transfer platform on which are rested the pieces of dough coming from the apparatus overhead to be transferred to the movable platform below, said transfer platform oscillating between an upper furthermost fixed position, below the area where the pieces of dough are discharged from the apparatus overhead, and a lower furthermost fixed position, a slight distance above the movable platform, said transfer platform comprising the upper surface of an endless belt sliding between two parallel idle drums and a crosswise support member fixed to said upper surface, parallel with said drums, said crosswise support lining up and supporting said pieces of dough, which are transferred by gravity from said overhead apparatus to said transfer platform, while said transfer platform is in the upper fixed position, in which said transfer platform is slanted, so that said piece of dough will not roll backwards because of gravity;

mechanical means for providing the transfer platform with an oscillating motion and for keeping the transfer platform locked in the said furthermost fixed positions for a predetermined amount of time; and other mechanical means for causing the pieces of dough to be discharged from the transfer platform when the latter is in its lower furthermost fixed position, said other mechanical means causing the upper part of the said belt to slide alternatively in the two directions between two furthermost positions, between a first position in which the working area on the upper part of the said belt is sufficient to receive the pieces of dough, and a second position in which the said working area is outside the said upper part.

2. An apparatus according to claim 1, including a transverse wall placed above the movable platform, the said wall being designed to oscillate around a horizontal, transverse shaft, between a vertical furthermost fixed position, to the left of the transfer platform on which the pieces of dough are rested (when the apparatus is viewed from the front) and a sufficient distance away to halt the pieces of dough as soon as they are discharged onto the movable platform, and a sloping furthermost fixed position in which the said wall is raised away from the movable platform, the motion of said wall depending on the motion of said oscillating transfer platform on which the pieces of dough are rested, said wall being used to avoid any error in lining up the pieces of dough when they are transferred to the movable platform; and third mechanical means which move integrally with the motion of the transfer platform on which the pieces of dough are rested, to give the wall the said oscillating motion and to keep it in the said furthermost fixed positions for a predetermined amount of time.

3. An apparatus according to claim 1, wherein said other mechanical means for discharging the pieces of dough from the transfer platform on which they are rested comprise at least one spigot fixed to the lower part of the said transfer platform;

at least one arm, rotating around a horizontal shaft, able to intercept the said spigot and to move it sufficiently far to cause the upper part of the said platform to slide from the first furthermost to the second furthermost position; and fixed guide means able to come into contact with the said spigot while the said transfer platform on which the pieces of dough are rested is oscillating between the lower furthermost fixed position and the upper furthermost fixed position, the said guide means being designed to cause the upper part of the said transfer platform to slide from the second furthermost to the first furthermost position.

* * * * *